US008906124B2

(12) United States Patent
Yoshikane et al.

(10) Patent No.: US 8,906,124 B2
(45) Date of Patent: Dec. 9, 2014

(54) DUST COLLECTING DEVICE

(75) Inventors: Kiyonobu Yoshikane, Anjo (JP); Yoshitaka Machida, Anjo (JP)

(73) Assignee: Makita Corporation, Anjo-Shi (JP)

( * ) Notice: Subject to any disclaimer, the term of this patent is extended or adjusted under 35 U.S.C. 154(b) by 132 days.

(21) Appl. No.: 13/554,474

(22) Filed: Jul. 20, 2012

(65) Prior Publication Data

US 2013/0031879 A1 Feb. 7, 2013

(30) Foreign Application Priority Data

Aug. 5, 2011 (JP) ................................. 2011-171930

(51) Int. Cl.
*B23Q 1/00* (2006.01)
*B23Q 11/00* (2006.01)

(52) U.S. Cl.
CPC .................................. *B23Q 11/0046* (2013.01)
USPC .............. 55/385.1; 55/360; 55/428; 173/198; 173/90; 408/58; 408/67

(58) Field of Classification Search
USPC ........ 55/385.1; 29/428; 173/198, 197, 75, 97, 173/171, 217; 408/58, 67; 175/209, 211
See application file for complete search history.

(56) References Cited

U.S. PATENT DOCUMENTS

| 7,354,226 | B2 * | 4/2008 | Britz ................................. 408/67 |
| 8,443,914 | B2 * | 5/2013 | Bito et al. ...................... 173/198 |
| 2007/0151075 | A1 * | 7/2007 | Izumisawa et al. .......... 16/110.1 |
| 2007/0210132 | A1 * | 9/2007 | Akiba ............................... 227/10 |
| 2008/0169114 | A1 * | 7/2008 | Wuensch et al. .............. 173/198 |
| 2013/0199810 | A1 * | 8/2013 | Wyler ......................... 173/162.2 |
| 2013/0289565 | A1 * | 10/2013 | Hassler, Jr. ....................... 606/79 |

FOREIGN PATENT DOCUMENTS

| EP | 1 459 842 A1 | 9/2004 |
| EP | 1 661 661 A1 | 5/2006 |
| JP | A-2006-102854 | 4/2006 |

OTHER PUBLICATIONS

European Search Report issued in Application No. 12177846.8; Dated Dec. 10, 2012.
Sep. 23, 2013 European Search Report issued in European Application No. 12 177 846.8.

* cited by examiner

*Primary Examiner* — Duane Smith
*Assistant Examiner* — Minh-Chau Pham
(74) *Attorney, Agent, or Firm* — Oliff PLC

(57) ABSTRACT

A dust collecting device is provided which is capable of preventing static charge while rationally collecting dust generated during operation. A dust collecting device is removably attached to a power tool and can be carried together with the power tool, and collects dust generated when a predetermined operation is performed on a workpiece by driving a tool bit coupled to the power tool. Further, the dust collecting device has a dust suction region that sucks dust generated during operation in response to the operation of the tool bit, a dust transfer region that transfers the dust sucked in the dust suction region, and a dust storage region that communicates with the dust transfer region and stores the dust. Furthermore, the dust collecting device has a grounding member through which static charge on the dust is dissipated.

7 Claims, 5 Drawing Sheets

DUST COLLECTING DEVICE

Cross reference to related application is made to the Japanese patent application JP2011-171930 filed on Aug. 5, 2011, the entire contents of which are herein incorporated by reference.

BACKGROUND OF THE INVENTION

1. Field of the Invention

The present invention relates to a dust collecting device which is removably attachable to a power tool and collects dust generated during operation, 2. Description of the Related Art Japanese non-examined laid-open Patent Publication No. 2006-102854 discloses a dust collecting hammer drill having a dust collecting device for collecting dust generated during operation. In a dust collecting hammer drill having a dust collecting device, static electricity is produced when dust generated during operation is sucked and collected in a dust collecting container, and the dust collecting container is charged with this static electricity. At this time, the static charge may be discharged when a user touches the dust collecting container, or it may adversely affect electrical components such as a controller for controlling a motor mounted in the dust collecting hammer drill. Therefore, in the above-mentioned known dust collecting hammer drill, an antistatic measure is taken by providing a grounding wire which connects a fan casing integrally formed with a housing and a dust collecting container.

While the above-mentioned known antistatic measure is countermeasure as a specifically designed specialized machine, it is desired to provide more simplified antistatic measure in a duct collecting device.

Japanese non-examined laid-open Patent Publication No. 2006-102854 is addressed as a prior art reference.

SUMMARY OF THE INVENTION

Accordingly, it is an object of the present invention to provide a dust collecting device that is capable of preventing static charge with a simple structure.

In order to solve the above-described problem, the dust collecting device according to a preferred embodiment of the present invention is removably attached to a power tool and can be carried together with the power tool. It collects dust generated when a predetermined operation is performed on a workpiece by driving a tool bit coupled to the power tool. The dust collecting device has a dust suction region that sucks dust generated during operation in response to the operation of the tool bit, a dust transfer region that transfers dust sucked in the dust suction region, and a dust storage region that communicates with the dust transfer region and stores the dust. The dust collecting device further has a grounding member through which static charge on the dust is dissipated. As a region to which static charge is dissipated, typically, a metal member forming a component of the dust collecting device is used. The manner in which the dust collecting device "can be carried" together with the power tool in the present invention represents the manner in which the dust collecting device is integrated with the power tool and carried together with the power tool when the power tool is operated to perform an operation.

The dust collecting device of the present invention is removably attached to the power tool and can be carried together with the power tool. With such a construction, when dust collection is needed during operation of the power tool, the dust collecting device can be attached in use to the power tool. The dust collecting device sucks dust generated during operation in the dust suction region and stores it in the dust storage region via the dust transfer region. Thus, a rational dust collecting operation is performed. When dust is sucked by the dust collecting device and stored in the dust storage region, static charge on dust can be dissipated through a grounding member. By provision of this construction, an adverse effect of static charge on a user can be avoided.

According to a further embodiment of the dust collecting device of the present invention, the grounding member is provided to dissipate static charge on dust stored in the dust storage region. In this case, preferably, the grounding member is formed by an electrically-conductive material disposed to face the dust storage region, and the static charge on the dust is dissipated through the electrically-conductive material. Further, as the electrically-conductive material, conductive resin kneaded with carbon or subjected to a process of evaporating metallic foil on its surface or other similar processes can be suitably used.

According to this embodiment, static charge on dust stored in the dust storage region can be dissipated, so that a rational antistatic measure can be realized.

According to a further embodiment of the dust collecting device of the present invention, the electrically-conductive material is electrically connected to an electrically-conductive region of the dust collecting device or an electrically-conductive region of the power tool to which the dust collecting device is attached, so that the static charge on the dust stored in the dust storage region is dissipated to the electrically-conductive region through the electrically-conductive material. As the "electrically-conductive region" in the present invention, a metal housing for a motor that drives a dust collecting fan of the dust collecting device, a metal housing for a motor that drives the tool bit of the power tool, or a metal housing that forms an outer shell of the power tool can be used.

According to this embodiment, static charge on the dust stored in the dust storage region can be dissipated to the electrically-conductive region of the dust collecting device or the electrically-conductive region of the power tool to which the dust collecting device is attached.

According to a further embodiment of the present invention, the dust collecting device has a dust storage region mounting part to which the dust storage region is attached, and the dust storage region is removably attached to the dust storage region mounting part. An intervening member is provided on the dust storage region mounting part and connects the electrically-conductive region and the electrically-conductive material. When the dust storage region is attached to the dust storage region mounting part, the intervening member serves to electrically connect the electrically-conductive region and the electrically-conductive material and also to cushion a contact region between the dust storage region and the dust storage region mounting part. The "intervening member" in the present invention preferably includes an electrically-conductive rubber having adequate elasticity.

According to this embodiment, the intervening member serves both the functions of "electrical connection" and "cushioning", so that the number of parts can be reduced and the structure can be made simpler.

According to a further embodiment of the dust collecting device of the present invention, the dust storage region has a dust collecting container body in which a dust filter is installed, and a filter holder for holding the dust filter. The filter holder is formed by the electrically-conductive material.

According to this embodiment, the filter holder is formed by the electrically-conductive material, so that a contact region of the filter holder which can come in contact with the dust collected in the dust collecting container body can be easily secured.

According to a further embodiment of the present invention, the dust collecting device further has a dust collecting fan that generates suction force for sucking dust and a dust collecting motor that drives the dust collecting fan.

According to this embodiment, the dust collecting operation can be performed by power of the dust collecting device itself without the aid of power on the power tool side.

According to a further embodiment of the dust collecting device of the present invention, an outer shell member for forming an outer shell of the dust collecting motor is utilized as a static electricity collecting region to which static charge is dissipated.

According to this embodiment, a member provided in the dust collecting device can be rationally utilized as a region to which static charge is dissipated.

In a further embodiment according to the present invention, a power tool to which the dust collecting device as defined in any one of claims 1 to 7 is attached is provided. Thus, the power tool having the dust collecting device which allows static charge on dust to be dissipated through the grounding member can be provided.

According to the present invention, a dust collecting device is provided which is capable of preventing static charge while rationally collecting dust generated during operation. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved dust collecting devices and method for using such dust collecting devices and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
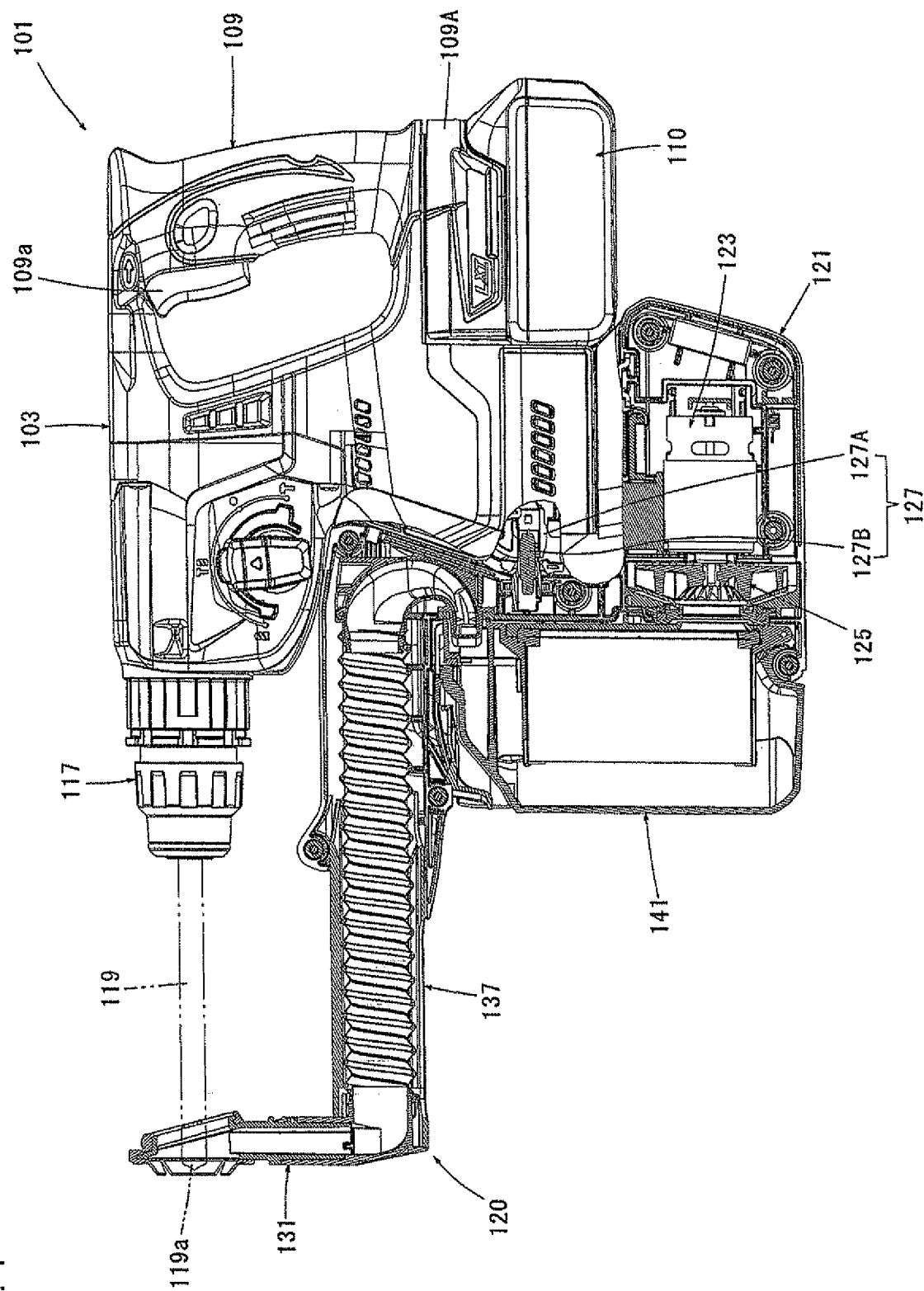
FIG. 1 is a side view showing an entire structure of a hammer drill to which a dust collecting attachment according to an embodiment of the present invention is attached.

An embodiment of the present invention is now described with reference to FIGS. 1 to 5. In this embodiment, a battery-powered hammer drill is explained as a representative example of a power tool according to the present invention. As shown in FIG. 1, a hammer drill 101 according to this embodiment mainly includes a power tool body in the form of a body 103 that forms an outer shell of the hammer drill 101, a hammer bit 119 detachably coupled to a front end region (left side as viewed in FIG. 1) of the body 103 via a tool holder 117, and a handgrip 109 that is connected to the body 103 on the side opposite to the hammer bit 119. The hammer bit 119 is held by the tool holder 117 such that it is allowed to reciprocate in its axial direction with respect to the tool holder 117 and prevented from rotating in its circumferential direction with respect to the tool holder 117. The hammer bit 119 is a feature that corresponds to the "tool bit" in the present invention. Further, for the sake of convenience of explanation, the hammer bit 119 side is taken as the front, and the handgrip 109 side as the rear.

The body 103 mainly includes a metal body housing that houses a driving mechanism which is not shown, such as a driving motor, a motion converting mechanism, a striking mechanism and a power transmitting mechanism. The handgrip 109 extends in a vertical direction transverse to the axial direction of the hammer bit 119 and an upper end and a lower end of the handgrip 109 are connected to the body 103, thereby forming a loop-shaped handle (D-shaped handle). A battery mounting part 109A is provided on the lower end of the handgrip 109 and a rechargeable battery pack 110 from which the driving motor 111 is powered is detachably mounted on the battery mounting part 109A.

The motion converting mechanism appropriately converts the rotating power of the driving motor into linear motion and then transmits it to the striking mechanism. Thus, the striking force in the axial direction (a horizontal direction as viewed in FIG. 1) is applied to the hammer bit 119 via the striking mechanism. Further, the power transmitting mechanism mainly includes a plurality of gears and appropriately reduces the speed of the rotating power of the driving motor and then transmits it to the hammer bit 119 via a final shaft in the form of the tool holder 117. As a result, the hammer bit 119 is caused to rotate in the circumferential direction. Further, the driving motor is driven when a user depresses a trigger 109a disposed on the handgrip 109.

The user can switch an operation mode of the hammer drill 101 among a hammer mode in which a chipping operation is performed on a workpiece by applying only a striking force to the hammer bit 119 in the axial direction, a hammer drill mode in which a drilling operation is performed on the workpiece by applying a striking force in the axial direction and a rotating force in the circumferential direction to the hammer bit 119 and a drill mode in which a drilling operation is performed on the workpiece by applying only a rotating force to the hammer bit 119 in the circumferential direction. This mode switching is however a known technique and not directly related to the present invention, and therefore its description is omitted.

A dust collecting attachment 120 is now explained with reference to FIGS. 2 to 5. The dust collecting attachment 120 is attached to the hammer drill 101 constructed as described above and serves to suck and collect dust generated during operation on the workpiece (such as concrete). The dust collecting attachment 120 is a feature that corresponds to the "dust collecting device" in the present invention.

The dust collecting attachment 120 according to this embodiment is of a type in which a dust collecting motor 123 as a power source for collecting dust and a dust collecting fan 125 are built into its body in the form of an attachment body 121. Further, the attachment body 121 is removably attached to an attachment mounting part in a lower region of a front surface of the body 103 by moving the dust collecting attachment 120 horizontally rearward from the front of the body 103 of the hammer drill 101 in the axial direction of the hammer bit 119.

Figure 2:
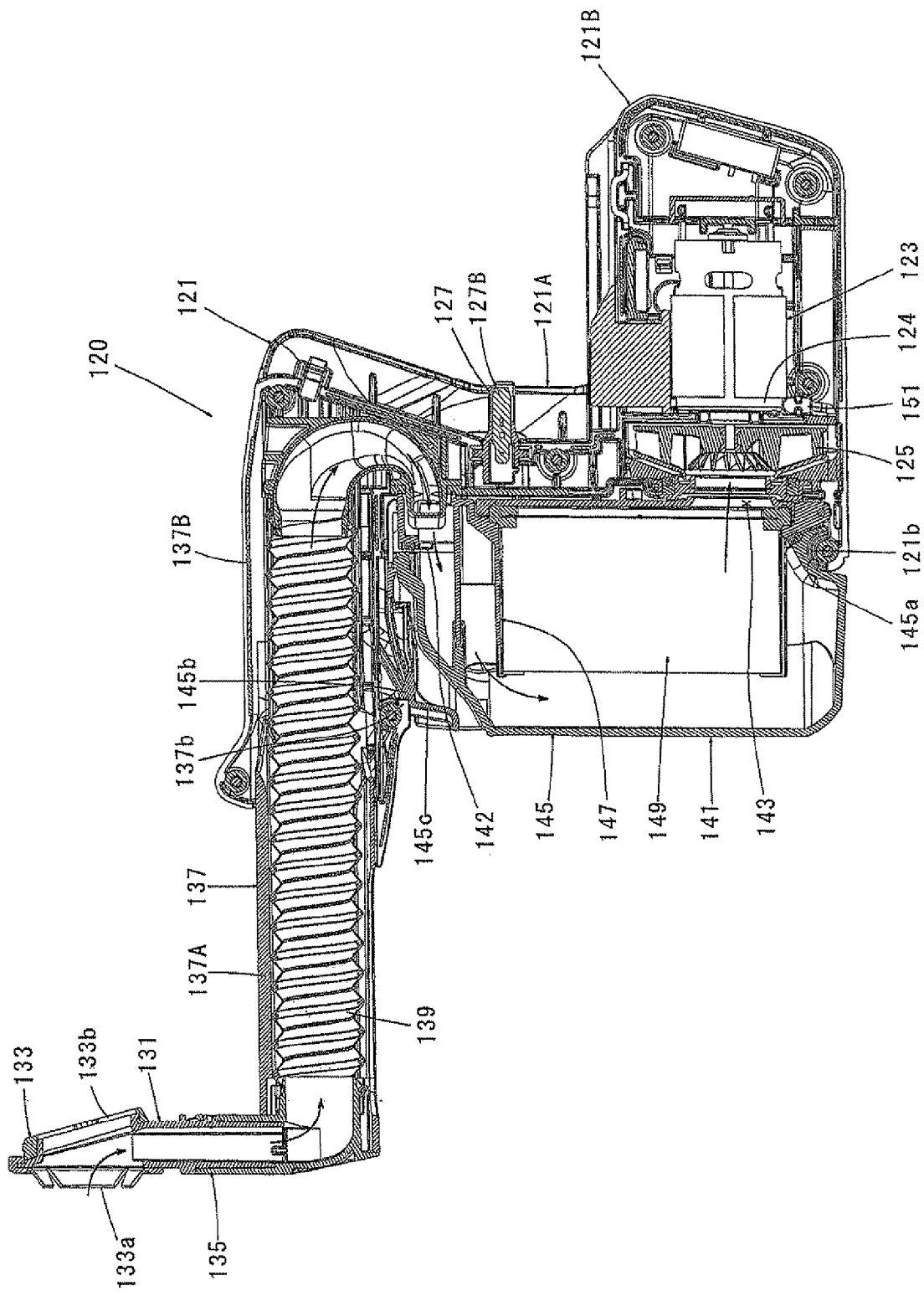
FIG. 2 is a sectional view showing an entire structure of the dust collecting attachment removed from the hammer drill.

As shown in FIG. 2, the dust collecting attachment 120 mainly includes the attachment body 121, the dust collecting motor 123, the dust collecting fan 125, a dust suction part 131, a dust transfer part 137 and a dust collecting container 141. When the dust collecting fan 125 is rotationally driven by the dust collecting motor 123, suction force is exerted on the dust suction part 131 via the dust collecting container 141 and the dust transfer part 137. Dust generated during operation is sucked through a dust suction port 133a of the dust suction part 131 by the suction force of the dust suction part 131 and collected in the dust collecting container 141 through the dust transfer part 137. The dust suction part 131, the dust transfer part 137 and the dust collecting container 141 are features that correspond to the "dust suction region", the "dust transfer region" and the "dust storage region", respectively, in the present invention.

The attachment body 121 is generally L-shaped as viewed from the side, having a vertical region extending straight downward from a rear end region of the dust transfer part 137 and a horizontal region extending rearward from a lower end region of the vertical region. The vertical region is configured as a container mounting part 121A to which the dust collecting container 141 is attached, and the horizontal region is configured as a dust collecting motor housing part 121B that houses the dust collecting motor 123.

The dust collecting motor 123 is disposed in the dust collecting motor housing part 121B such that its rotation axis extends in parallel to the axial direction of the hammer bit 119. The dust collecting motor 123 generates suction force in the dust collecting container 141 by rotationally driving the dust collecting fan 125 disposed in front of the dust collecting motor 123. This suction force is exerted on the dust suction part 131 via the dust collecting container 141 and the dust transfer part 137.

The dust suction part 131 has a generally box-like cylindrical suction part 133 having an open front as the dust suction port 133a, and a hollow suction body 135. The hollow suction body 135 extends from the cylindrical suction part 133 in a downward direction transverse to the axial direction of the hammer bit 119 and has an extending end connected to the dust transfer part 137. The cylindrical suction part 133 is configured and provided as a dust suction member that covers (surrounds) a bit tip 119a (see FIG. 1) of the hammer bit 119 which extends forward to the dust suction port 133a through a rear end wall 133b formed in the rear of the cylindrical suction part 133, with a predetermined clearance, when the dust collecting attachment 120 is attached to the body 103 of the hammer drill 101. The cylindrical suction part 133 is pressed against a workpiece during operation. Dust sucked into the cylindrical suction part 133 is transferred to the dust transfer part 137 through the suction body 135.

The dust transfer part 137 connected to the suction body 135 extends in parallel to the axial direction of the hammer bit 119 in a position displaced from the hammer bit 119 in a direction transverse to the axial direction of the hammer bit 119. When the operation is performed on the workpiece by the hammer bit 119 with the cylindrical suction part 133 pressed against the workpiece together with the hammer bit 119, the dust suction part 131 must retract toward the body 103 with respect to the hammer bit 119 as the operation proceeds (the hammer bit 119 digs into the workpiece).

The dust transfer part 137 is configured as a dust transfer cylindrical member that extends in parallel to the hammer bit 119 and can expand and contract in order to allow the dust suction part 131 to retract. The dust transfer part 137 is telescopically formed having a movable cylindrical part 137A and a fixed cylindrical part 137B which are fitted one into the other and can slide in the axial direction with respect to each other. A front end of the movable cylindrical part 137A is connected to the suction body 135, and the fixed cylindrical part 137B forms part of the attachment body 121. Therefore, the dust suction part 131 is connected to the attachment body 121 via the dust transfer part 137 and can move in the axial direction of the hammer bit 119.

An accordion hose 139 is disposed inside the movable cylindrical part 137A and the fixed cylindrical part 137B, and dust is transferred through the hose 139. The hose 139 is connected to the rear end of the suction body 135 at its front end and connected to the rear end of the fixed cylindrical part 137B at its rear end, and the hose 139 communicates with a dust suction opening 142 of the dust collecting container 141. Further, the dust transfer part 137 is normally held in an extended state (initial state) by elastic force of an accordion region of the hose 139.

As shown in FIG. 1, a connector 127 is provided between the attachment body 121 and the body 103 and connects an electrical wiring on the body 103 side and an electrical wiring on the dust collecting attachment side. In this embodiment, a connector 127B on the dust collecting attachment side is configured as a male connector formed by a protruding member that protrudes horizontally rearward from a rear end surface of the container mounting part 121A of the attachment body 121. A connector 127A on the body side is configured as a female connector formed by a recessed member that extends horizontally rearward from a front surface of the body 103 (a motor housing 105). When the dust collecting attachment 120 is moved horizontally rearward from the front of the body 103 and attached to the body 103, the male connector 127B is inserted into the female connector 127A, so that an electrical wiring terminal on the dust collecting attachment side is connected to an electrical wiring terminal on the body side. Specifically, when the dust collecting attachment 120 is attached to the body 103, the dust collecting attachment 120 is electrically connected to the body 103. Thus, when the driving motor 111 is driven by depressing the trigger 109a, the dust collecting motor 123 is also simultaneously driven.

As shown in FIG. 2, the dust collecting container 141 is attached in contact to a vertical front surface of the container mounting part 121A of the attachment body 121 from the front, and is disposed below the rear region of the dust transfer part 137. The dust collecting container 141 has a dust suction opening 142 and an air discharge port 143. The dust suction opening 142 is formed in an upper region of the dust collecting container 141 in order to suck dust transferred through an inner passage of the dust transfer part 137 into the dust collecting container 141, and the air discharge port 143 is formed in a lower region of the dust collecting container 141 in order to discharge air filtrated through a dust filter 149. The air discharge port 143 is opposed to the dust collecting fan 125.

Figure 3:
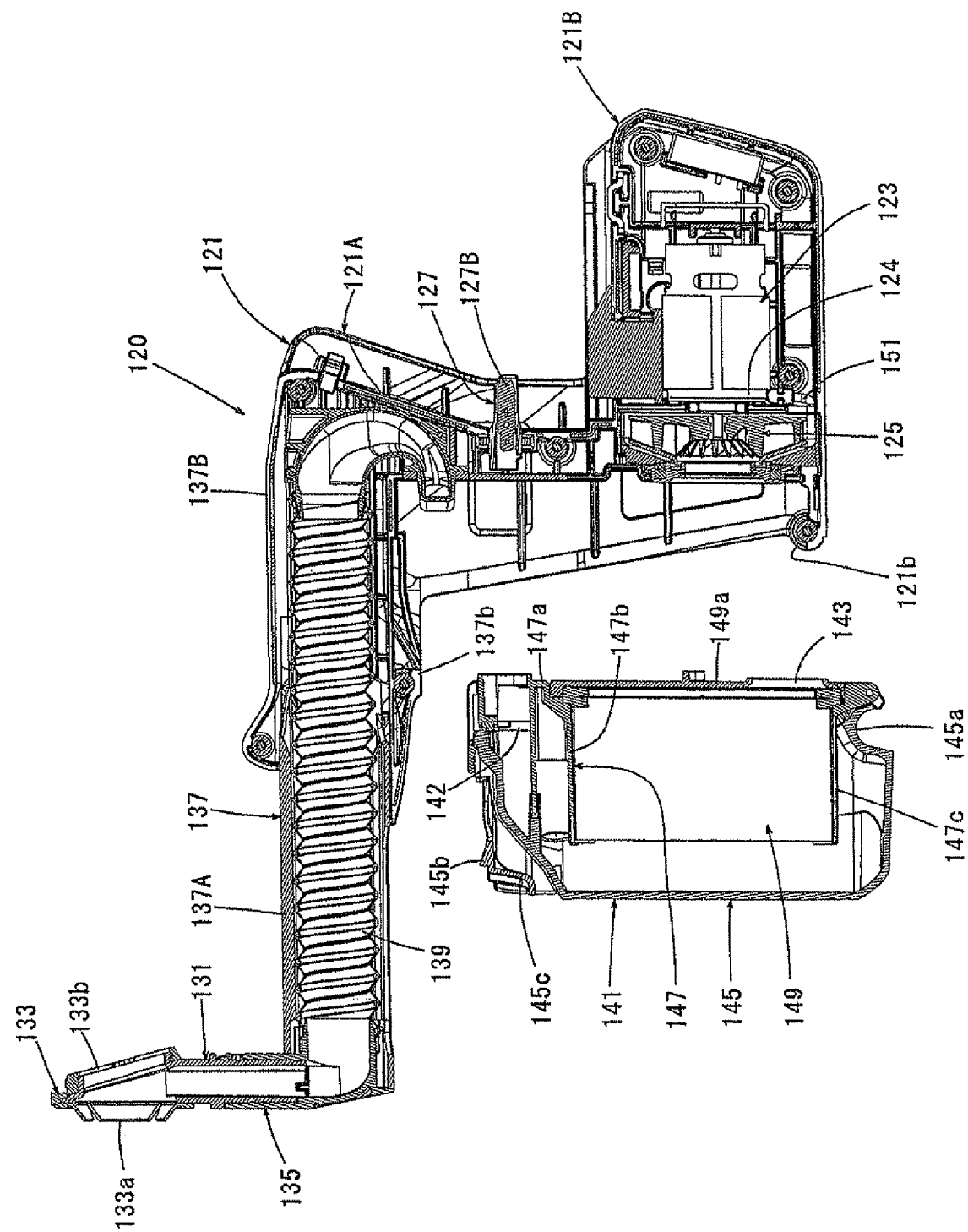
FIG. 3 schematically illustrates a state in which a dust collecting container is removed from the dust collecting attachment.
Figure 4:
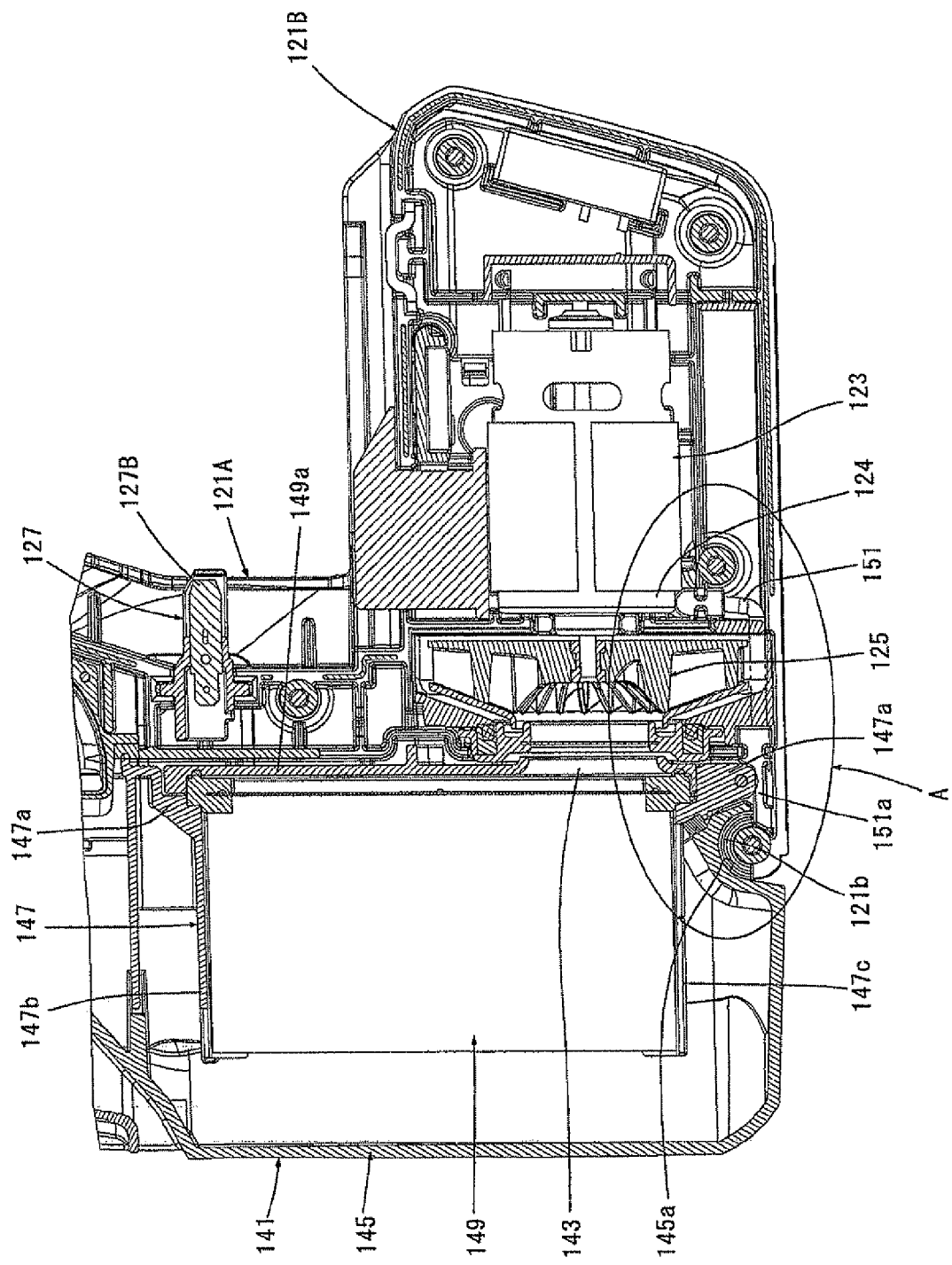
FIG. 4 is an enlarged sectional view showing the dust collecting container, a dust collecting fan and a dust collecting motor.
Figure 5:
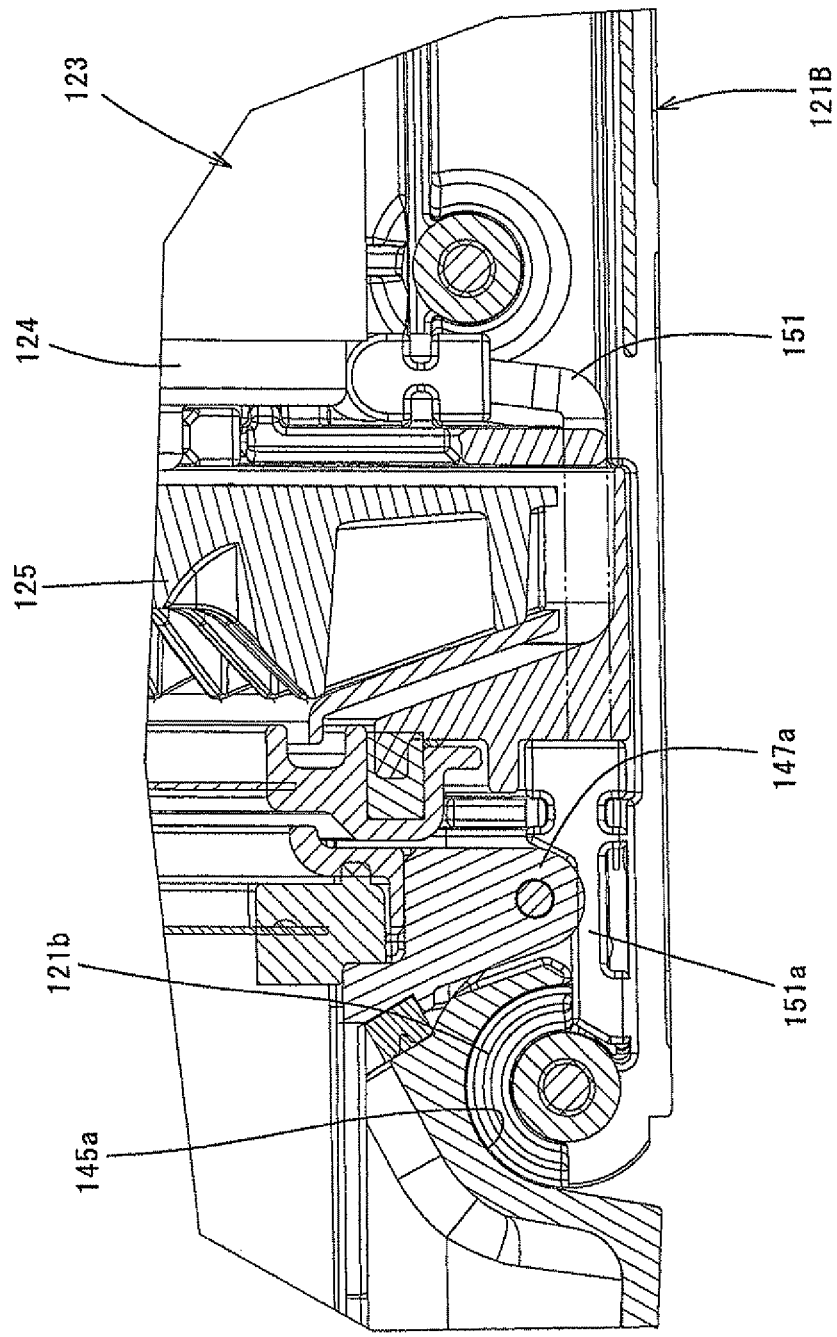
FIG. 5 is a further enlarged view of part A in FIG. 4.

As shown in FIGS. 3 and 4, the dust collecting container 141 mainly includes a dust collecting container body 145 in which the dust filter 149 is installed, and a filter holder 147 which holds the dust filter 149. The dust collecting container body 145 is shaped in a generally rectangular box-like form having an open rear side (right side as viewed in the drawings). The filter holder 147 is configured as a frame member having a vertically extending rectangular frame 147a, a top board 147b extending horizontally forward from an upper end of the rectangular frame 147a, and right and left arms 147c extending horizontally forward from a lower end of the rectangular frame 147a. The dust filter 149 is generally cuboid and its one side is fixed to a seat 149a. The dust filter 149 is horizontally inserted between the top board 147b and the arms 147c through an opening of the rectangular frame 147a, and the periphery of the dust filter 149 is held by the filter holder 147. The filter holder 147 holding the dust filter 149 is inserted into the dust collecting container body 145 through its opening and removably attached to the dust collecting container body 145. Further, the dust filter 149 held by the filter holder 147 is disposed with predetermined clearances from inner wall surfaces of the dust collecting container 141.

The dust collecting container 141 has a generally semicircular engagement recess 145a on a rear end of a lower surface of the dust collecting container body 145 and has a lock lever 145c with an engagement claw 145b on a front end of an upper surface of the dust collecting container body 145. The dust collecting container body 145 is tilted forward from the position shown in FIG. 3, and the engagement recess 145a of the dust collecting container body 145 is engaged with a circular receiving part 121b formed on a front end of the bottom of the dust collecting motor housing part 121B of the attachment body 121. In this state, when the dust collecting container body 145 is rotated rearward on the circular receiving part 121b, the engagement claw 145b is elastically engaged with an engagement part 137b formed on the dust transfer part 137 side. In this manner, as shown in FIG. 2, the dust collecting container 141 is attached to the container mounting part 121A with stability. On the other hand, when the lock lever 145c is pressed obliquely downward with the dust collecting container 141 attached to the container mounting part 121A, the engagement claw 145b is disengaged from the engagement part 137b, Thereafter, the dust collecting container 141 can be easily removed from the container mounting part 121A by rotating the dust collecting container body 145 forward on the circular receiving part 121b. Specifically, the dust collecting container 141 is removably attached to the container mounting part 121A.

In the state in which the dust collecting container 141 is attached to the container mounting part 121A, when a user presses the hammer bit 119 against the workpiece and drives the hammer drill 101 to perform a drilling operation, dust generated during operation is sucked through the dust suction port 133a of the cylindrical suction part 133 pressed against the workpiece. Then, as shown in FIG. 2 by arrows, dust is transferred through the suction body 135 and the dust transfer part 137 and collected in the dust collecting container 141.

During the above-described dust collection, the dust collecting container 141 may be charged with static electricity produced when dust is sucked and collected in the dust collecting container 141, and the static charge may adversely affect the user or a controller for controlling the motor. In view of this, in this embodiment, dust collected in the dust collecting container 141 is electrically connected with a metal region of the dust collecting motor 123 such that static charge on dust can be dissipated to the dust collecting motor 123.

Therefore, in this embodiment, the filter holder 147 is formed of conductive resin kneaded with carbon or subjected to a process of evaporating metallic foil on its surface or other similar processes. Further, the filter holder 147 is electrically connected to a metal outer housing 124 forming the outer shell of the dust collecting motor 123 via an electrically-conductive member 151 formed of conductive rubber (chloroprene rubber with an addition of carbon powder). The filter holder 147 is a feature that corresponds to the "grounding member" and the "electrically-conductive material" in the present invention. The electrically-conductive member 151 is a feature that corresponds to the "intervening member" in the present invention. The outer housing 124 is a feature that corresponds to the "electrically-conductive region" and the "outer shell member" in the present invention.

The electrically-conductive member 151 is disposed on a front region of the bottom of the dust collecting motor housing part 121B and extends in the longitudinal direction of the hammer drill. In the vicinity of the circular receiving part 121b which serves as a pivot on which the dust collecting container 141 is rotated for attachment or detachment, one end (front end) of the electrically-conductive member 151 in the extending direction is held in contact with a lower edge of the rectangular frame 147a of the filter holder 147. The other end of the electrically-conductive member 151 is held in contact with the outer housing 124 of the dust collecting motor 123. By provision of this construction, the electrically-conductive member 151 electrically connects the filter holder 147 and the outer housing 124 of the dust collecting motor 123.

When the engagement recess 145a of the dust collecting container body 145 is engaged with the circular receiving part 121b of the dust collecting motor housing part 121B and the dust collecting container 141 is rotated rearward in order to attach the dust collecting container 141 to the container mounting part 121A of the attachment body 12, an upper surface of an opposed region 151a of the electrically-conductive member 151 which is opposed to the lower edge of the rectangular frame 147a of the filter holder 147 is pressed and elastically deformed by the lower edge of the rectangular frame 147a of the filter holder 147 and held in contact with it.

According to the dust collecting attachment 120 of this embodiment which is constructed as described above, dust collected in the dust collecting container 141 is electrically connected to the outer housing of the dust collecting motor 123 via the filter holder 147 and the electrically-conductive member 151, and static charge on dust can be dissipated to the outer housing 124. By provision of this construction, static charge on the outer surface of the dust collecting container body 145 can be prevented.

Particularly in this embodiment, as described above, the filter holder 147 is configured as a frame-like member having the top board 147b and the arms 147c which extend within the dust collecting container body 145. By provision of this construction, a region of the filter holder 147 which can come in contact with dust collected in the dust collecting container body 145 can be sufficiently secured. Therefore, static charge on dust which is sucked into the dust collecting container body 145 is dissipated from the filter holder 147 to the outer housing 124 of the dust collecting motor 123 via the electrically-conductive member 151, so that an adverse effect of the static charge on the user or the controller for controlling the motor can be avoided.

When the dust collecting container 141 is attached to the container mounting part 121A, the electrically-conductive member 151 is pressed and elastically deformed by the lower edge of the rectangular frame 147a of the filter holder 147, so that the electrically-conductive member 151 elastically supports the dust collecting container 141 in the vertical direction with respect to the container mounting part 121A. Thus, the electrically-conductive member 151 serves to secure electrical connection between the electrically-conductive member 151 and the filter holder 147, and also serves to absorb rattle between the dust collecting container 141 and the container mounting part 121A and exert a cushioning effect therebetween. Specifically, the electrically-conductive member 151 according to this embodiment serves as an electrical connecting member and also as a cushioning member. With this construction, the number of parts can be reduced compared with a construction in which they are separately provided, so that the structure can be effectively made simpler.

In this embodiment, the metal outer housing 124 of the dust collecting motor 123 is utilized as an electrically-conductive region to which static charge on dust is dissipated, but the present invention is not limited to this. For example, a metal member of the hammer drill 101, such as an outer housing of a driving motor or a body housing forming the body 103, may be utilized as the electrically-conductive region. When the hammer drill side metal member is utilized as a region to which static charge on dust is dissipated, the static charge can be dissipated through a grounding connector (socket grounding).

In the above-described embodiment, the hammer drill 101 is explained as a representative example of the power tool, but the present invention may be applied to an electric hammer in which the hammer bit 119 performs only hammering movement in its axial direction, or to other power tools such as a cutting tool and a grinding or polishing tool.

Following aspects can be provided according to the invention.

Aspect 1

A dust collecting device, which is removably attachable to a portable power tool and carriable together with the portable power tool, wherein the dust collecting device collects dust generated when a predetermined operation is performed on a workpiece by driving a tool bit coupled to the power tool, comprising:

a dust suction region that sucks dust generated during operation in response to the operation of the tool bit, a dust transfer region that transfers the dust sucked in the dust suction region, and a dust storage region that communicates with the dust transfer region and stores the dust, and a grounding member through which static charge on the dust is dissipated.

Aspect 2

The grounding member is provided to dissipate static charge on the dust stored in the dust storage region.

Aspect 3

The grounding member comprises an electrically-conductive material disposed to face the dust storage region and the static charge on the dust is dissipated through the electrically-conductive material.

Aspect 4

The electrically-conductive material is electrically connected to an electrically-conductive region of the dust collecting device or an electrically-conductive region of the power tool to which the dust collecting device is attached, so that the static charge on the dust stored in the dust storage region is dissipated to the electrically-conductive region through the electrically-conductive material.

Aspect 5

The dust collecting comprises:

a dust storage region mounting part to which the dust storage region is attached, wherein:

the dust storage region is removably attached to the dust storage region mounting part, an intervening member is provided on the dust storage region mounting part and connects the electrically-conductive region and the electrically-conductive material, and when the dust storage region is attached to the dust storage region mounting part, the intervening member serves to electrically connect the electrically-conductive region and the electrically-conductive material and also to cushion a contact region between the dust storage region and the dust storage region mounting part.

Aspect 6

The dust storage region has a dust collecting container body in which a dust filter is installed, and a filter holder for holding the dust filter, and the filter holder comprises the electrically-conductive material.

Aspect 7

The dust collecting device further comprising:

a dust collecting fan that generates suction force for sucking dust generated during operation and collecting the dust in the dust storage region, and a dust collecting motor that drives the dust collecting fan.

Aspect 8

An outer shell member for forming an outer shell of the dust collecting motor comprises a static electricity collecting region to which static charge is dissipated.

Aspect 9

A power tool to which the dust collecting device is attached.

DESCRIPTION OF NUMERALS

101 hammer drill (power tool)
103 body
109 handgrip
109A battery mounting part
109a trigger
110 battery pack
117 tool holder
119 hammer bit (tool bit)
119a bit tip
120 dust collecting attachment (dust collecting device)
121 attachment body (dust collecting container body)
121A container mounting part (dust storage region mounting part)
121B dust collecting motor housing part
121b circular receiving part
123 dust collecting motor
124 outer housing (electrically-conductive region)
125 dust collecting fan
127 connector
127A body side connector
127B attachment side connector
131 dust suction part (dust suction region)
133 cylindrical suction part
133a dust suction port
133b rear end wall
135 suction body
137 dust transfer part (dust transfer region)
137A movable cylindrical part
137E fixed cylindrical part
137b engagement part
139 hose
141 dust collecting container (dust storage region)
142 opening
143 air discharge port
145 dust collecting container body
145a engagement recess
145b engagement claw 145c lock lever
147 filter holder (grounding member, electrically-conductive material)
147a rectangular frame
147b top board
147c arm
149 dust filter
149a seat
151 electrically-conductive member (intervening member)
151a opposed region

The invention claimed is:

1. A dust collecting device, which is configured to be removably attached to a portable power tool and carriable together with the portable power tool, wherein the dust collecting device configured to collect dust generated when a predetermined operation is performed on a workpiece by driving a tool bit coupled to the power tool, comprising:
 a dust suction region that sucks dust generated during operation in response to the operation of the tool bit,
 a dust transfer region that transfers the dust sucked in the dust suction region,
 a dust storage region that communicates with the dust transfer region and stores the dust,
 a grounding member through which static charge on the dust is dissipated, the grounding member being disposed inside the dust storage region, the grounding member comprising an electrically-conductive material,
 a dust storage region mounting part to which the dust storage region is attached, the dust storage region being removably attached to the dust storage region mounting part, and
 an intervening member which is provided on the dust storage region mounting part, the intervening member being formed of conductive elastic material,
 wherein when the dust storage region is attached to the dust storage region mounting part, the intervening member (i) electrically connects a) an electrically-conductive region of the dust collecting device or an electrically-conductive region of the power tool to which the dust collecting device is attached and b) the grounding member so that the static change on the dust stored in the dust storage region is dissipated to the electrically-conductive region of the dust collecting device or the electrically-conductive re ion of the power tool through the grounding member, and (ii) also serves to cushion a contact region between the dust storage region and the dust storage region mouunting part, the intervening member elastically supporting the dust storage region.

2. The dust collecting device as defined in claim 1, wherein the dust storage region has a dust collecting container body in which a dust filter is installed, and a filter holder for holding the dust filter, and the filter holder comprises the electrically-conductive material.

3. The dust collecting device as defined in claim 1, further comprising:
 a dust collecting fan that generates suction force for sucking dust generated during operation and collecting the dust in the dust storage region, and
 a dust collecting motor that drives the dust collecting fan.

4. The dust collecting device as defined in claim 3, wherein an outer shell member for forming an outer shell of the dust collecting motor comprises a static electricity collecting region to which static charge is dissipated.

5. A power tool to which the dust collecting device as defined in claim 1 is attached.

6. A dust collecting device, which is configured to be removably attached to a portable power tool and carriable together with the portable power tool, wherein the dust collecting device configured to collect dust generated when a predetermined operation is performed on a workpiece by driving a tool bit coupled to the power tool, comprising:
 a dust suction region that sucks dust generated during operation in response to the operation of the tool bit,
 a dust transfer region that transfers the dust sucked in the dust suction region, and
 a dust storage region that communicates with the dust transfer region and stores the dust, the dust storage region having a filter holder disposed inside the dust storage region, the filter holder being configured to hold a dust filter, the filter holder being formed by an electrically conductive material so that static charge on the dust is dissipated through the filter holder.

7. A dust collecting device, which is configured to be removably attached to a portable power tool and carriable together with the portable power tool, wherein the dust collecting device configured to collect dust generated when a predetermined operation is performed on a workpiece by driving a tool bit coupled to the power tool, comprising:
 a dust suction region that sucks dust generated during operation in response to the operation of the tool bit,
 a dust transfer region that transfers the dust sucked in the dust suction region,
 a dust storage region that communicates with the dust transfer region and stores the dust, and
 a grounding member through which static charge on the dust is dissipated, the grounding member being disposed inside the dust storage region, the grounding member being electrically connected to a motor housing, the motor housing being disposed inside the dust collecting device and being configured to install a motor therein.

* * * * *